United States Patent
Okamoto

[15] 3,637,057
[45] Jan. 25, 1972

[54] APPARATUS FOR RELEASING CLUTCH AND BRAKES TO PREVENT WHEEL SKID

[72] Inventor: Tosiaki Okamoto, Toyota-shi, Japan
[73] Assignee: Aisin Seiki Company Limited, Toyota-shi, Japan
[22] Filed: Oct. 21, 1969
[21] Appl. No.: 868,141

[30] Foreign Application Priority Data
Oct. 22, 1968 Japan..................43/76574

[52] U.S. Cl. ...................192/13 R, 192/91 R, 188/181 A, 303/21
[51] Int. Cl.......................................F16d 67/04
[58] Field of Search ...........192/13 R, 4 A; 188/181 A

[56] References Cited

UNITED STATES PATENTS

| | | | |
|---|---|---|---|
| 1,996,282 | 4/1935 | Drabin et al. | 192/13 X |
| 1,999,284 | 4/1935 | Colvin | 192/13 X |
| 2,016,308 | 10/1935 | Wyllie | 192/13 X |
| 3,401,986 | 9/1968 | Walker et al. | 188/181 A X |
| 3,473,850 | 10/1969 | Lawrie | 188/181 A X |

*Primary Examiner*—Benjamin W. Wyche
*Attorney*—Sughrue, Rothwell, Mion, Zinn & Macpeak

[57] ABSTRACT

A vehicle having a conventional clutch pedal and brake pedal is provided with an antiskid brake system wherein a wheel rotation sensor provides a signal for the automatic release and reapplication of the brakes during a substantial wheel lock condition. Upon the initial reception of the signal, the clutch will automatically be released and will be maintained in the release position during any subsequent automatic release and reapplication of the brakes during a continuous single operation of the brake pedal.

6 Claims, 2 Drawing Figures

3,637,057

APPARATUS FOR RELEASING CLUTCH AND BRAKES TO PREVENT WHEEL SKID

This invention relates to a method for the prevention of lateral slippage of a powered vehicle, frequent appearing in the course of sudden and considerable hydraulic brake applications.

As is commonly known, the rotational speeds of wheels of a powered vehicle or the peripheral speeds of the heels may frequently become considerably and excessively slower than the occasional advancing speed of the vehicle in the course of hydraulic brake application. In such cases, so-called slips could certainly appear between the vehicle wheels and the ground surface.

It has been therefore already proposed for providing an efficient counter measure to sense the excessively retarded peripheral speed of vehicle wheels relative to the absolute running speed of the vehicle against the ground for delivering an instruction signal and to reduce provisionally the hydraulic brake pressure upon reception of the delivered signal so far as it's delivery continues, so as to recover the excessively retarded wheel speed to such a degree that the so adjusted wheel speed keeps pace with the occasional absolute speed of the vehicle so as to prevent possible wheel lock, and then to increase the brake pressure again, and so on.

Such repeated brake pressure releases and reapplications are the predominant feature of operation of the antiskid hydraulic brake pressure control apparatus, or briefly "antiskid apparatus" adapted for preventing lateral vehicle skids.

Upon a brake pressure release or reduction during the cyclic braking operation, the rotational speed of the vehicle wheels will recover again nearly to the absolute running speed of the vehicle. This speed recovery is introduced by the driving force which is transmitted from the ground surface to the vehicle wheels. The amount of this counter drive force depends naturally upon the surface conditions of the ground. For smaller value of the coefficient of adhesion appearing between the ground surface and the wheel tires, the counter drive force will be correspondingly smaller, and vice versa.

When the rear wheels are subjected to locking during the progress of brake application with the clutch mechanism coupled, so that these wheels are making slips, the vehicle's drive engine will be caused to stop. Even when the antiskid apparatus is brought into actuation at this stage so as to reduce the hydraulic brake pressure to be fed to the rear wheels, thus the brake application on to these wheels becoming weaker, the counter drive force of the above kind must cover at least the power necessary for initiating engine restarting, added with various mechanical losses in the transmission system of the vehicle. For smaller values of coefficient of adhesion which means that the ground surface conditions are disadvantageous, the counter drive force may frequently be smaller than the necessary drive force of the above kind. In this case, the vehicle rear wheels may fail to reinitiate rotation, even when the antiskid apparatus is brought into function for releasing or reducing the hydraulic brake pressure fed to the rear wheels, which means an unsatisfactory operation of the apparatus.

In order to avoid such unsatisfactory function of the antiskid braking system, it is necessary to disengage the vehicle clutch in advance, to allow the antiskid apparatus to operate with trouble-free action. It should be concluded therefore that a more effective skid prevention will be realized by disengaging the vehicle clutch upon actuation of the antiskid apparatus.

It is therefore the main object of the invention to provide an improved technique for allowing the antiskid apparatus to operate in a more efficient way without inviting the aforementioned conventional drawbacks.

For the realization of the above object, the method according to this invention resides in its broadest coverage the combination of the following steps:

1. sensing a wheel lock during braking stage for vehicle wheels;
2. reducing the hydraulic brake pressure upon reception of an instruction signal informing of a sensed wheel lock, and
3. interrupting at the same time the conventional clutch means inserted between the vehicle drive engine and the vehicle wheels upon the reception of said instruction signal.

The apparatus for carrying out the above method resides in its broadest aspect in the combination of the following several constituents:

1. sensor for sensing an impending or realized wheel lock in the course of a wheel brake application;
2. controller for receiving an instruction signal from said sensor and for controlling hydraulic brake pressure being delivered to hydraulic wheel brake means in its pressure-reducing direction upon reception of said instruction signal; and
3. a releaser operatively connected with said controller for releasing the clutch upon actuation of said controller.

These and further objects, features and advantages of the invention will become more apparent as the description by reference to the accompanying drawings, in which.

Figure 1:
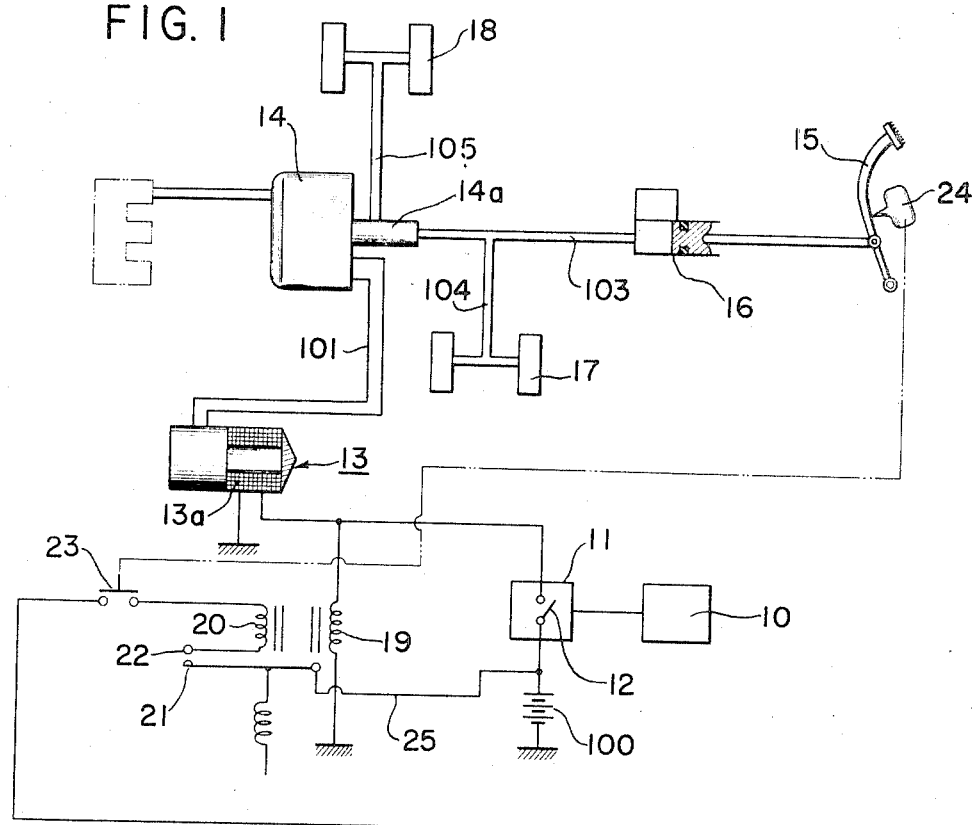
FIG. 1 is a schematic general arrangement view of an apparatus adapted for carrying out the method according to this invention.
Figure 1:
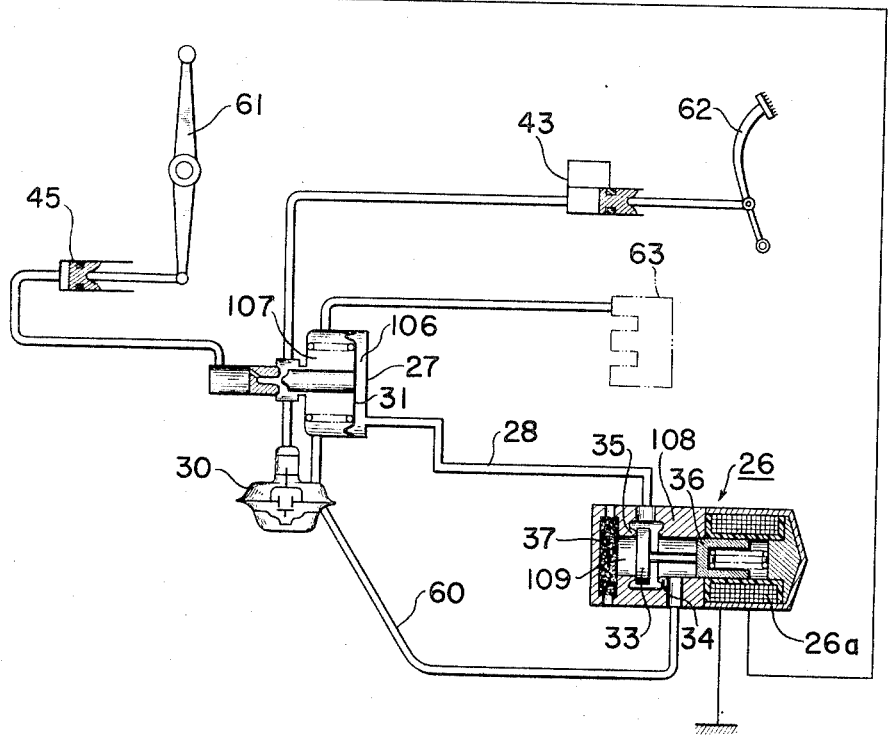

In the following, a preferred embodiment of the invention will be described in detail by reference to FIGS. 1 and 2.

In the drawings, the numeral 10 represents a sensor operatively connected with vehicle wheels, not shown, for sensing the rotational conditions thereof, the sensor being shown only in a highly simplified way by a block by virtue of the very popularity of the design and function. 11 denotes a switching means responsive to a skid sensor of the known construction adapted for sensing an impending or already brought-about wheel lock which appears upon a sudden and considerable or excess application of brake pressure to the wheels. When a wheel lock should be encountered during brake application, a slip of vehicle wheel or wheels on the ground may be certainly invited which means, as commonly known, a dangerous steering condition of the vehicle. Such a switching means as at 11 is highly known in its design and function among those skilled in the art. The switching means 11 comprises a switch 12 which is electrically connected, on the one hand, with a solenoid coil 13a of air-vacuum changeover valve assembly generally denoted 13, and grounded through a current source 100, on the other hand.

The numeral 14 denotes antiskid control of known design which is fluidically connected through piping means 101 with said changeover valve assembly 13.

A conventional manual brake actuator shaped preferably into a foot-operated pedal 15 is operatively connected, as conventionally, with a master cylinder 16 of known construction, the latter being connected hydraulically and directly through pipings 103 and 104 to front wheel hydraulic brake means 17. Master cylinder 16 is also hydraulically connected through piping 103, a part 14a of said control 14 and a further piping 105 to rear wheel hydraulic brake means 18.

When the brake pedal 15 is actuated, pressurized oil will be directly supplied from the master cylinder 16 to the front wheel brake means 17, but the braking conditions of the rear wheel brake means 18 is somewhat different from that of the front wheel when a sudden and considerable braking effort is applied to the pedal 15 in such a degree that a wheel slippage against the ground surface is invited during the brake application. In this case, the sensor 10 is brought into actuation upon sensing such wheel slippage or lock, and switch 12 is turned to "on," whereby the solenoid 13a of valve assembly 13 is energized and the pneumatic conditions in the control 14 are conditioned, as conventionally, so as to perform the desired controlling function. Under these operating conditions, pressure oil delivery to rear wheel brake means 18 is controlled in the brake effort reducing direction for minimizing or obviating the rear wheel slippage, as is commonly known. The function of the control 14 will be described more in details hereinafter.

The numeral 19 denotes an electromagnetic relay which is connected electrically in parallel to said switch 12 and provided with a self-maintaining coil 20. When the relay 19 is actuated, thereby its movable contact 21 being brought into engagement with its mating stationary contact 22 and self-maintaining coil 20 being energized, the now established engaging conditions between contacts 21-22 is preserved under the magnetic influence of the maintaining coil, even upon an opening of said switch 12. This self-maintaining operation requires naturally the following preparatory design conditions. More specifically, a movable contact 23 is operatively connected with a switch means 24 arranged to be on-off controlled by brake pedal 15 in such a way that with the pedal kept in its actuated position switch 23 is being closed. In this actuated conditions, a circuit comprising lead 25; movable contact 21; stationary contact 22; coil 20; switch 23, and the solenoid coil 26a of vacuum-air changeover valve assembly 26 of clutch control, and further including the ground connection, is being energized even upon opening of the switch 12.

The valve assembly 26 is pneumatically and directly connected through a piping 28 with the right-hand chamber 106 of clutch booster 27, on the one hand, and connected pneumatically and indirectly through a piping 60 and a control valve assembly 30 with the left-hand chamber 107 of the same clutch booster, as clearly shown.

Figure 2:
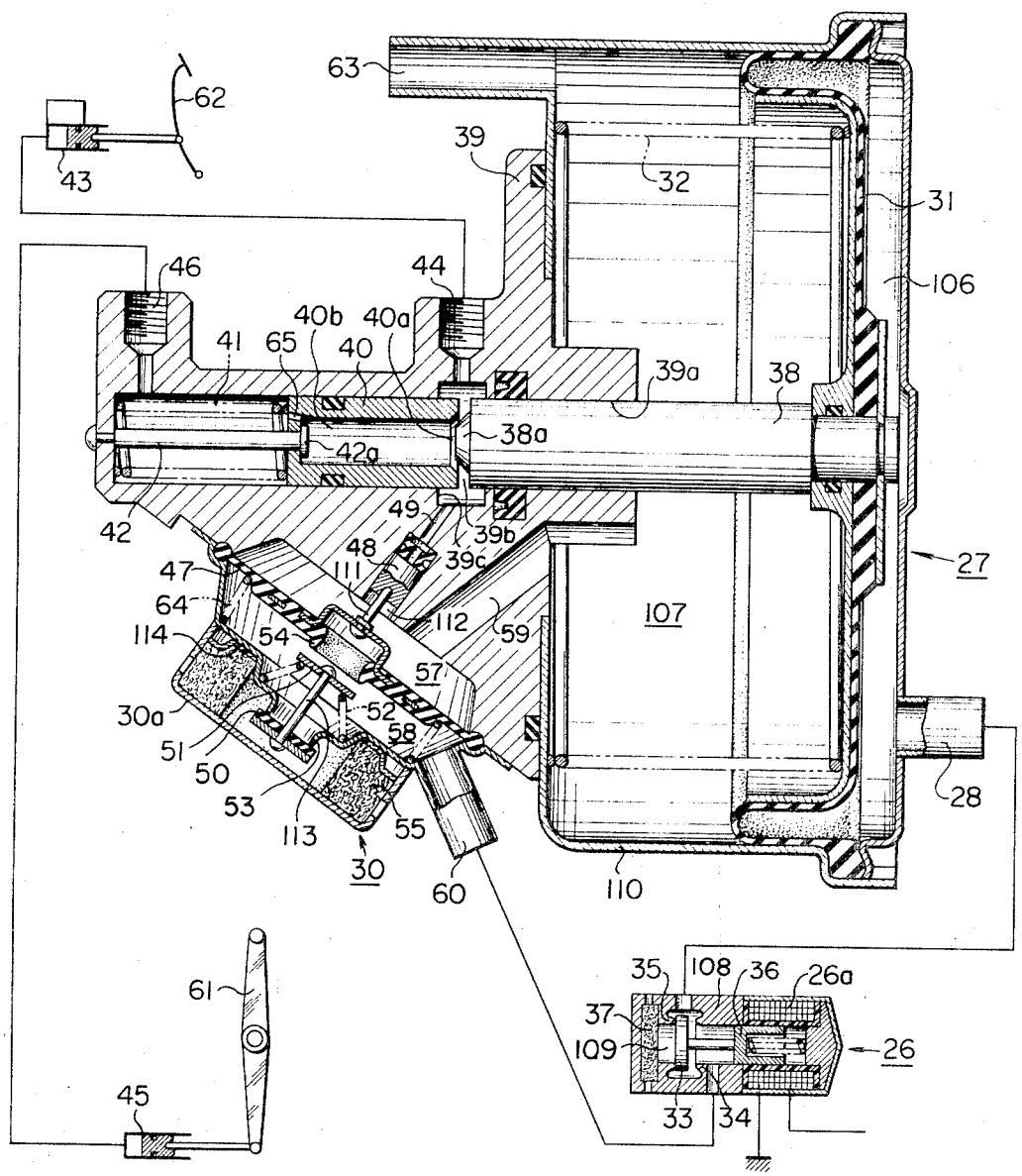
FIG. 2 is an enlarged and longitudinal sectional view of a clutch booster and its several related parts employed in the arrangement shown in FIG. 1.

These chambers 106 and 107 are separated from each other by a diaphragm piston 31 which is resiliently urged to move rightwards in FIG. 2 under the action of a spring 32. As will be more fully described hereinafter, when said both chambers 106 and 107 are filled with a negative or vacuum pressure, the diaphragm piston 31 will be kept in its position shown.

A valve 33 is fixedly attached to a plunger 36 which is mounted slidably in the horizontal or axial direction in the valve assembly 26, said valve being arranged selectively to cooperate with either of valve seats 34 and 35. The left-hand part of axial bore 109 provided in the housing 108 of valve assembly 26 is kept in communication through filter material 37 with atmospheric air, as shown.

The detail construction of clutch booster 27 and its attached control valve assembly 30 is shown in FIG. 2.

Clutch booster 27 comprises a housing 110 containing slidably said diaphragm piston 31, a plunger 38 being fixedly attached with its one end to said piston at its center. The booster 27 comprises further a body member 39 which is rigidly connected with said housing 110, although the fixing means have been omitted from the drawing only for simplification. The body 39 is formed with an axial bore 39a which receives slidably said plunger 38 having at its left-hand end a substantially truncated cone-shaped projection 38a. In the axial bore 39a there is a hollow and slidable piston member 40 having at its right-hand end a correspondingly truncated cone-shaped recess 40a arranged in opposition to said plunger's projection 38a. The axial bore 39a is closed at its left-hand end against which one end of spring 41 abuts, while the opposite end of the latter is kept in pressure abutment against the left-hand end of said hollow piston 40. An elongated stop means 42 is fixedly attached to the closed end of said axial bore 39a and extends from the bore-closing end wall a considerable distance concentrically with the piston 40 and bore 39a, the right-hand end of said stop means 42 invading into the piston bore 40b and constituting an enlarged end 42a acting as the stop per se. As will be easily supposed, the purpose of this stop means 42-42a is to limit the maximum allowable length of expansion of said pring 41.

In the position shown, there is a gap distance between the plunger's projection 38a and the recessed piston end 40a, so as to establish an intermediate space 39b which is kept in fluid communication through a lateral port 44 with clutch master cylinder assembly 43. In close proximity of the closed end of the bore 39a, there is provided a further lateral bore 46 which is fluidically connected with a clutch-release cylinder assembly 45.

Control valve assembly 30 is fixedly attached to the body member 39, the interior space of said valve assembly being divided into two separate chambers 57 and 58 by means of a diaphragm piston 47 which is connected mechanically through connecting means 111 with a plunger 48 slidably received in a recess 112 formed in the body member 39 and kept in fluid communication with a duct 49 through a ring space 39c formed in the material of the body member 39, if the plunger 48 should be neglected, said duct 49 communicating fluidically with said intermediate chamber 39b.

Even when the booster 27 is actuated, the plunger 38 is brought into engagement with the piston 40, thus the effective volume of said intermediate chamber becoming nil, port 44 is still kept in fluid communication with duct 49 through the intermediary of the ring space 39c.

Valve elements 50 and 51 are rigidly connected together by means of a connecting rod 113. A compression spring 52 is inserted between valve member 50 and a separation wall 114 made integral with the housing 30a, whereby the other valve element 50 is urged to move towards its valve seat 53 formed in the separating wall 114. Valve element 51 is arranged so that it can cooperate with valve seat 54 formed in the diaphragm 47 at its center.

When the plunger 48 is moved downwards from its position shown, the valve seat 54 of diaphragm 47 is brought into pressure engagement with the valve element 51, thereby the hitherto established fluid communication between chambers 57 and 58 being interrupted.

With further downward movement of plunger 48, the valve element 50 is separated from its cooperating valve seat 53, thereby the ambient atmospheric air being brought into communication through air filter 55 with the chamber 58. Communication passage 59 bored through the body member 39 serves for establishing fluid communication between the said chamber 57 and the left-hand chamber 107 of booster 27.

Control valve assembly 30 is further formed with a port 60 which serves for establishing fluid communication of the chamber 58 with the right-hand chamber 106 of booster assembly 27 through the valve assembly 26.

Numeral 61 denotes a conventional clutch-releasing lever and numeral 62 represents a conventional clutch pedal.

As will become more apparent from the following disclosure of operation of the present apparatus, when the brake pedal is kept in its actuated position and a wheel slip is sensed, the clutch can be released without actuation of the clutch pedal, thereby increasing considerably the desired antiskid effect.

When the brake pedal is actuated so as to apply brake, pressurized oil is fed directly from the master cylinder 16 to front wheel brake 17, while pressurized oil will be conveyed from the master cylinder 16 through the control 14 to rear wheel brake 18.

When there is no slip appearing between vehicle wheels and the ground surface, same oil pressure will be conveyed to the front wheel brake means as well as to the rear wheel brake means. If there is sensed a wheel slip, sensor 10 is actuated and electric instruction signal will be conveyed to switching means 11, thereby switch 12 is brought into its closed position, thus, as commonly known, changeover valve assembly 13 being thereby actuated and the control 14 is also brought into actuation. In this manner, pressurized oil delivery from the master cylinder 16 to rear wheel brake 18 is interrupted, and at the same time the oil pressure being delivered to rear wheel brake is reduced, so as to prevent further wheel slippage. At the same time with closure said switch 12, relay 19 is brought into actuation, movable contact 21 is brought into engagement with stationary contact 22. It should be noted that since switch 24 actuated by brake pedal 15 is turned to "on" upon actuation of brake pedal 15, switch contact 23 is also in its on-position. In this way, the solenoid of changeover valve assembly 26 is energized, so as to move the valve 33 rightwards from its position shown until it engages with valve seat 34, thereby the fluid communication between passages 28 and 60 being interrupted. By the rightward movement of the valve 33, the opposite side thereof is brought into separation from valve seat 37, thereby passage 28 brought into fluid communication through air filter with the ambient atmosphere. Thus, diaphragm 31 of booster 27 will move leftwards from the position shown. By the actuation of changeover valve assembly 26 in the above-mentioned manner, only the right-hand chamber of diaphragm 31 is brought into communication with the atmospheric air, thus the diaphragm being pneumatically caused to move in the left-hand direction. With this leftward movement of the diaphragm, plunger 38 is also moved leftwards correspondingly and its end projection 38a being brought into tight engagement with the correspondingly recessed piston end 40a. With further leftward movement of the plunger, the oil pressure prevailing in the left-hand chamber of piston 40 is increased and conveyed to clutch releasing cylinder 45, thereby clutch-release lever 61 being actuated so as to release the clutch.

It will be seen that upon actuation of the skid-sensing means, the above-mentioned operation will be brought about and the clutch will be released without any intentional actuation of clutch pedal by the vehicle driver.

By the provision of switch means 24, self-maintaining coil 20 and switch means 23 and in spite of occasionally invited intermittent action of the antiskid control apparatus, thus intermittent on-off action of switch 12 being invited, the solenoid of air-vacuum changeover valve assembly 26 does not follow after the above-mentioned intermittent on-off operation. In this way, the clutch is disengaged so far as the brake pedal is being actuated.

In case of the antiskid control apparatus failed to operate, or in case of the whole arrangement acting in the regular manner, actuation of clutch pedal 62 causes the pressurized oil from clutch master cylinder 43 to be conveyed at first to the intermediate space between the inner end of plunger 38 and the corresponding end of piston 40, thence through port or passage 49 to the cylinder for piston 48 of control valve assembly 48. In this way, diaphragm 47 is urged to move outwardly and its valve seat 54 is brought into pressure engagement with valve element 51, thereby the fluid communication between ports 59 and 60 being interrupted. At the same time, valve element 50 is caused to separate from its mating valve seat 53 and passage 60 is brought into communication with the atmospheric air. The pneumatic action is conveyed through changeover valve assembly 26, which has been brought into its position shown in FIG. 1, upon diaphragm 31, the latter being caused to move leftwards in FIG. 2 for releasing the clutch. Even with the plunger 38 brought into engagement with piston 40, passages 44 and 49 being kept in fluid communication through ring space 39c, diaphragm 47 is returned to its shown position under the influence of return spring 64, by intentional release of the clutch pedal by the vehicle driver, thus the clutch being also returned to its original position.

There is provided a port 65 at the outer end of the piston 40. This port 65 serves for allowing a trouble-free return movement of piston 40 under the action of return spring 41.

As will be noted from the foregoing disclosure, the invention provides a unique combination of the clutch booster with the antiskid control assembly, thereby providing an automatic clutch release and thus an automatic release of the functional combination between the vehicle drive engine and the vehicle wheels, should there a wheel slip be sensed, and, indeed, without intentional actuation of the clutch pedal by the vehicle driver. By this measures, therefore, the necessary energy for the restarting of the engine at this stage can be saved. As a result, the overall engine drive costs can be saved considerably and at the same time the desirous prevention of wheel slippage caused by the application of excess braking effort can be realized in a highly economical and effective manner.

What we claim is:

1. An apparatus for the simultaneous control of antiskid brake means and clutch means comprising, sensor means for sensing substantial wheel lock conditions in the course of brake application and for delivering an instruction signal, control means for controlling hydraulic wheel brake pressure being delivered from a master cylinder to said brake means, said control means being operatively connected with said brake means and said sensor means to reduce said pressure upon reception of said signal to release said brake means and to increase said pressure when said signal ceases to reapply said brake means, and release means operatively connected with said clutch means and said sensor means for automatically releasing said clutch means upon initial reception of said signal and maintaining said clutch means released during subsequent release and reapplication of said brake means by said control means during a single continuous braking operation.

2. An apparatus as set forth in claim 1 wherein said release means includes hydraulically operated clutch-releasing means, clutch booster means operatively connected to said clutch-releasing means and having two chambers separated by a movable piston for boosting hydraulic pressure in said clutch-releasing means, and changeover valve means operatively connected with said clutch booster means and said sensor means and responsive to said signal for controlling said clutch booster means.

3. An apparatus as set forth in claim 2 wherein said release means further comprises first passage means connected between said two chambers, said changeover valve means being provided within said first passage, second passage means connecting a clutch master cylinder with a clutch-releasing cylinder, third passage means normally connecting one of said chambers with a vacuum source, slidable means adapted to cooperate with said piston for on-off control of said second passage means, and spring means for urging said piston in its opening direction of said second passage means whereby upon reception of said signal operating said changeover valve means, the pressure differential in said chambers will be controlled so as to move said piston in a direction in which said passage means is interrupted.

4. An apparatus as set forth in claim 3 wherein a control valve means is disposed between said clutch booster means and said changeover valve means, said control valve means comprising two chambers separated by a diaphragm piston, one of said chambers being connected with one of said chambers of said clutch booster means and the other of said chambers being connected with said changeover valve means, said control valve means further comprising valve means responsive to foot pressure exerted upon a clutch pedal and including a first valve element for on-off control of passage means connected between said chambers of said control valve means and a second valve element for on-off control of passage means connected between the other of said chambers of said control valve means and the atmosphere.

5. An apparatus as set forth in claim 2 further comprising circuit means adapted to electrically connect said sensor means with said changeover valve means and for electrically connecting said sensor means with said control means, said circuit means comprising switch means operable by said sensor means, relay means electrically connected with said switch means and provided with holding means, additional switch means operable by said relay means and brake pedal operated switch means.

6. A method for hydraulic brake and clutch control comprising sensing a substantial wheel lock condition during braking of a vehicle, providing a signal in response to said sensing to automatically control means for reducing and increasing hydraulic brake pressure, simultaneously and automatically releasing the clutch means of the vehicle upon the initial reception of said signal.

* * * * *